(12) United States Patent  
Choi et al.

(10) Patent No.: US 9,098,791 B2  
(45) Date of Patent: Aug. 4, 2015

(54) TAG INTEGRATED CIRCUIT MODULE APPARATUS AND METHOD OF FABRICATING TAG INTEGRATED CIRCUIT MODULE APPARATUS

(71) Applicants: Electronics and Telecommunications Research Institute, Daejeon (KR); NETHOM, Co., Ltd, Gyenggi-Do (KR)

(72) Inventors: Won Kyu Choi, Daejeon (KR); Jong Suk Chae, Daejeon (KR); Seung Hwan Jeong, Jeollabuk-do (KR); Chan Won Park, Daejeon (KR); Cheol Sig Pyo, Daejeon (KR); Hae Won Son, Jeollabuk-do (KR); Kun Hong Lee, Seoul (KR)

(73) Assignees: ELECTRONICS AND TELECOMMUNICATIONS RESEARCH INSTITUTE, Daejeon (KR); NETHOM CO., LTD, Gyenggi-Do (KR)

( * ) Notice: Subject to any disclaimer, the term of this patent is extended or adjusted under 35 U.S.C. 154(b) by 0 days.

(21) Appl. No.: 14/023,964

(22) Filed: Sep. 11, 2013

(65) Prior Publication Data

US 2014/0117095 A1    May 1, 2014

(30) Foreign Application Priority Data

Nov. 1, 2012  (KR) .................. 10-2012-0123117

(51) Int. Cl.  
*G06K 19/06*  (2006.01)  
*G06K 19/077*  (2006.01)

(52) U.S. Cl.  
CPC .............................. *G06K 19/07783* (2013.01)

(58) Field of Classification Search  
CPC .......... G06K 7/10851; G06K 7/10693; G06K 7/10702; G06K 7/10801; G06K 7/14; G06K 7/10; G06K 7/08; G06K 5/00; G06K 19/06; G06K 19/07783; G06K 19/07771; G06F 17/08  
USPC ................................... 235/492, 380, 451, 375  
See application file for complete search history.

(56) References Cited

U.S. PATENT DOCUMENTS

| | | | |
|---|---|---|---|
| 7,040,536 B2 * | 5/2006 | Rosenfeld ...................... 235/383 |
| 7,044,388 B2 * | 5/2006 | Kamiya et al. ................. 235/492 |
| 2002/0027531 A1 * | 3/2002 | Brown et al. ................. 343/895 |
| 2006/0145872 A1 * | 7/2006 | Tanaka et al. ............... 340/572.8 |
| 2008/0106412 A1 * | 5/2008 | Sakama et al. ............. 340/572.1 |
| 2009/0009330 A1 * | 1/2009 | Sakama et al. ............. 340/572.1 |
| 2009/0262041 A1 * | 10/2009 | Ikemoto et al. ............... 343/860 |
| 2010/0181379 A1 * | 7/2010 | Okegawa et al. ............. 235/488 |
| 2010/0219941 A1 | 9/2010 | Pagano et al. |
| 2012/0086556 A1 * | 4/2012 | Ikemoto ....................... 340/10.1 |
| 2013/0181805 A1 * | 7/2013 | Saito et al. .................. 336/84 M |
| 2013/0314453 A1 * | 11/2013 | Ko ................................. 345/690 |

FOREIGN PATENT DOCUMENTS

| | | |
|---|---|---|
| KR | 10-0793060 B1 | 1/2008 |
| KR | 10-1006808 B1 | 1/2011 |

* cited by examiner

*Primary Examiner* — Edwyn Labaze  
(74) *Attorney, Agent, or Firm* — Rabin & Berdo, P.C.

(57) ABSTRACT

Provided is a tag integrated circuit (IC) module apparatus and a method of fabricating tag IC module apparatus. The tag IC module apparatus may include an n-turn loop coil, n denoting a natural number, connected in series with a tag IC, and a printed circuit board (PCB) disposed below the tag IC and patterned with the n-turn loop coil.

11 Claims, 8 Drawing Sheets

TOP SURFACE OF UPPER
DIELECTRIC SUBSTRATE 305-1

BOTTOM SURFACE OF LOWER
DIELECTRIC SUBSTRATE 305-2

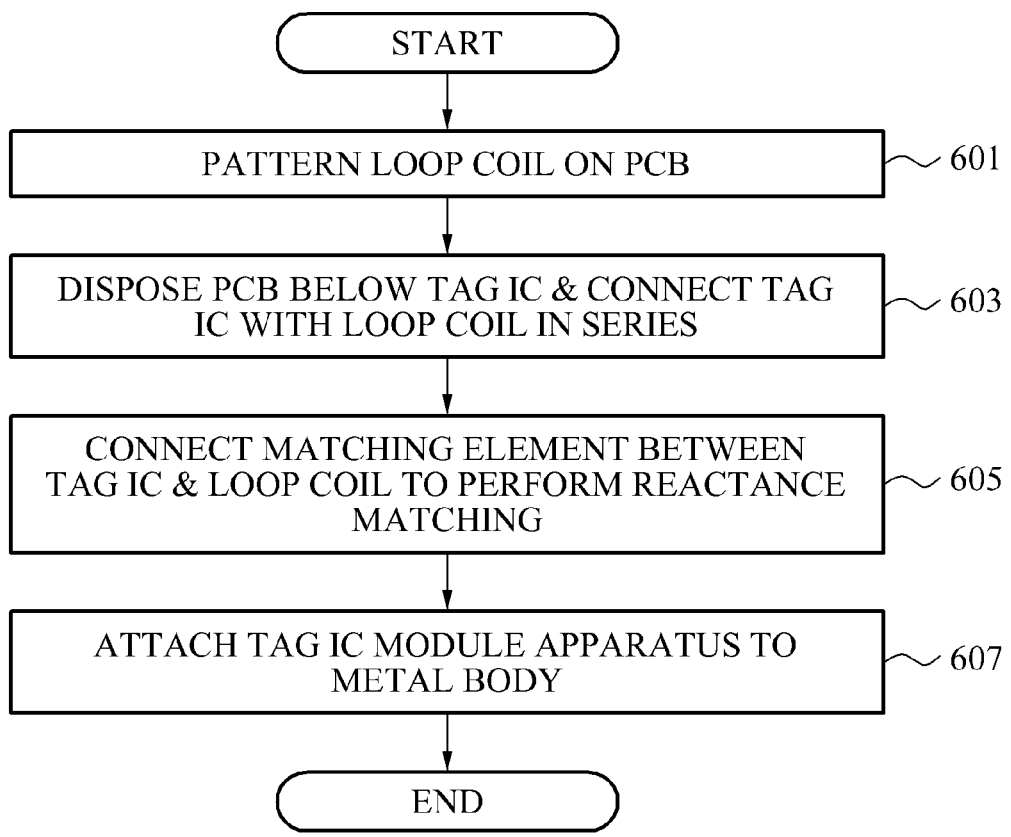

TAG INTEGRATED CIRCUIT MODULE APPARATUS AND METHOD OF FABRICATING TAG INTEGRATED CIRCUIT MODULE APPARATUS

CROSS-REFERENCE TO RELATED APPLICATION

This application claims the priority benefit of Korean Patent Application No. 10-2012-0123117, filed on Nov. 1, 2012, in the Korean Intellectual Property Office, the disclosure of which is incorporated herein by reference.

BACKGROUND

1. Field of the Invention

Embodiments of the present invention relate to a tag integrated circuit (IC) module apparatus and a method of fabricating the tag IC module apparatus which may be compactly fabricated by excluding a radiator and using an attachable metal body as the radiator.

2. Description of the Related Art

A radio frequency identification (RFID) tag may be used along with an RFID reader in various fields, such as, materials management, security, and the like. In general, when an object to which the RFID tag is attached is disposed in a read zone of the RFID reader, the RFID reader modulates a radio frequency (RF) signal having a predetermined carrier frequency and transmits an interrogation signal to the RFID tag. Subsequently, the RFID tag responds to the interrogation signal of the RFID reader.

A passive RFID tag receives the RF signal transmitted from the RFID reader, converts the RF signal to a direct current, and uses the direct current as operation power of the passive RFID tag. Accordingly, an intensity of the RF signal received by the RFID tag needs to be greater than a predetermined threshold for normal operation of the passive RFID tag. To improve a read range of the passive RFID reader, an increase in transmission power of the RFID reader is required. However, the transmission power of the RFID reader is regulated according to local regulations of each country, such as, the Federal Communication Commission (FCC) in the U.S.A. and thus, limitations exist on increasing the transmission power of the RFID reader.

Accordingly, a tag antenna capable of efficiently receiving the RF signal transmitted from the RFID reader may be used to maximize the read range of the RFID reader with respect to the RFID tag.

However, the conventional tag antenna uses an inductive coupling occurring between a metal radiator and a feed loop to which a tag IC is attached by closely disposing the feed loop to the metal radiator. Since a metal radiator in a shape of a long metal strip is included, a size of the conventional tag antenna increases and thus, compact fabrication thereof is difficult.

SUMMARY

An aspect of the present invention provides a tag integrated circuit (IC) module apparatus which may be compactly fabricated by excluding a radiator and using an attachable metal body as the radiator.

According to an aspect of the present invention, there is provided a tag IC module apparatus including an n-turn loop coil connected in series with a tag IC, and a first printed circuit board (PCB) disposed below the tag IC and patterned with the n-turn loop coil. Here, n denotes a natural number.

According to another aspect of the present invention, there is also provided a method of fabricating a tag IC module apparatus including patterning an n-turn loop coil on a PCB, and disposing the PCB below a tag IC, and connecting the tag IC with the n-turn loop coil in series. Here, n denotes a natural number.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a flowchart illustrating a method of fabricating a tag IC module apparatus according to an embodiment of the present invention.

DETAILED DESCRIPTION

Figure 1:
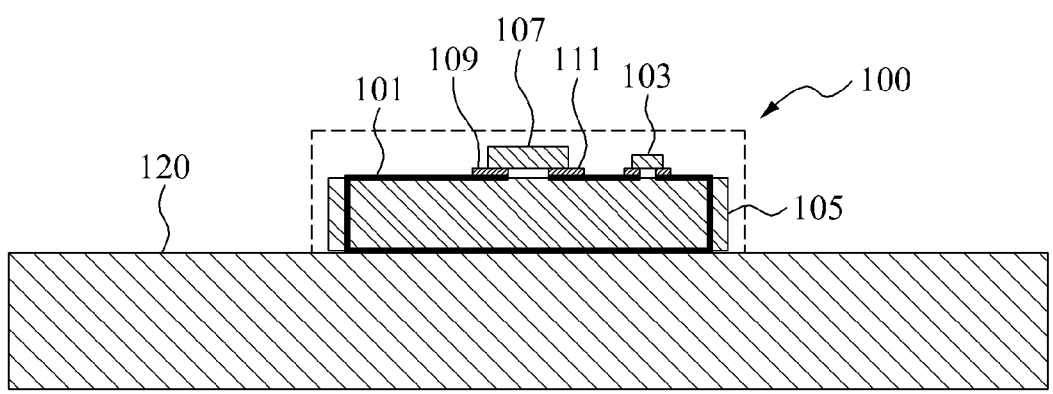
FIG. 1 is a cross-sectional view illustrating a tag integrate circuit (IC) module apparatus according to an embodiment of the present invention.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

Hereinafter, a tag integrated circuit (IC) module apparatus and a method of fabricating the tag IC module apparatus according to an embodiment of the present invention will be described in detail with reference to the accompany drawings. Here, the tag IC module apparatus may be included in, for example, a radio frequency identification (RFID) tag antenna.

FIG. 1 is a cross-sectional view illustrating a tag IC module apparatus 100 according to an embodiment of the present invention Referring to FIG. 1, the tag IC module apparatus 100 may include an n-turn loop coil 101, a matching element 103, and a first printed circuit board (PCB) 105. Here, n denotes a natural number.

The n-turn loop coil 101 may be connected in series with a tag IC 107. In this instance, the n-turn loop coil 101 may be, for example, a one-turn loop coil.

The n-turn loop coil 101 may use a metal body 120 as an existing radiator when the tag IC module apparatus 100 is attached to the metal body 120, for example, an object to which a tag is attached. More particularly, the n-turn loop coil 101 may inductively couple an induced radio frequency (RF) signal to the metal body 120 and transfer the induced RF signal to the tag IC 107 when the tag IC module apparatus 100 is attached to the metal body 120. For example, the n-turn loop coil 101 may inductively couple an induced RF signal to a ground plane of a second PCB (not shown) of an electronic device, and transfer the induced RF signal to the tag IC 107 when the tag IC module apparatus 100 is attached to the second PCB.

In addition, the n-turn loop coil 101 may be fabricated by connecting a conductive pattern formed on at least one of a top surface and a bottom surface of a dielectric substrate included in the first PCB 105 with a via hole formed on the dielectric substrate.

In case of attaching the tag IC module apparatus 100 to the metal body 120, the tag IC module apparatus 100 may be attached using, for example, soldering or an adhesive. In this instance, a loop surface of the n-turn loop coil 101 may be attached to the metal body 120 in a vertical disposition.

The matching element 103 may be disposed between the tag IC 107 and the n-turn loop coil 101, or may be disposed within the n-turn loop coil 101 as an element to perform reactance matching between the tag IC 107 and the n-turn loop coil 101. More particularly, the matching element 103 may enable a reactance component of the tag IC 107 and a reactance component of the n-turn loop coil 101, as viewed from a connector 109 or 111 of the tag IC 107, to constitute a conjugate relationship.

The first PCB 105 may be disposed below the tag IC 107 and patterned with the n-turn loop coil 101. The first PCB 105 may include m dielectric substrates in which a conductive pattern is formed on at least one of a top surface and a bottom surface. Here, m denotes a natural number. For example, a number of dielectric substrates may be one.

Figure 2:
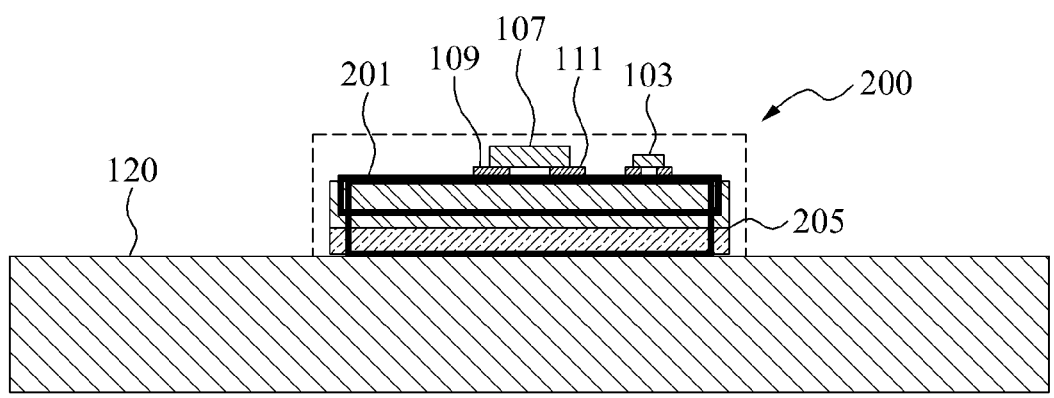
FIG. 2 is a cross-sectional view illustrating a tag IC module apparatus according to another embodiment of the present invention.

FIG. 2 is a cross-sectional view illustrating a tag IC module apparatus 200 according to another embodiment of the present invention.

Referring to FIG. 2, a basic configuration of the tag IC module apparatus 200, according to another embodiment of the present invention, is identical to the configuration of the tag IC module apparatus 100 of FIG. 1 and thus, a repeated description thereof will be omitted for conciseness and ease of description.

In FIG. 2, a loop coil 201 may include a plurality of turns, and a first PCB 205 may include a plurality of dielectric substrates formed through stacking.

Figure 3:
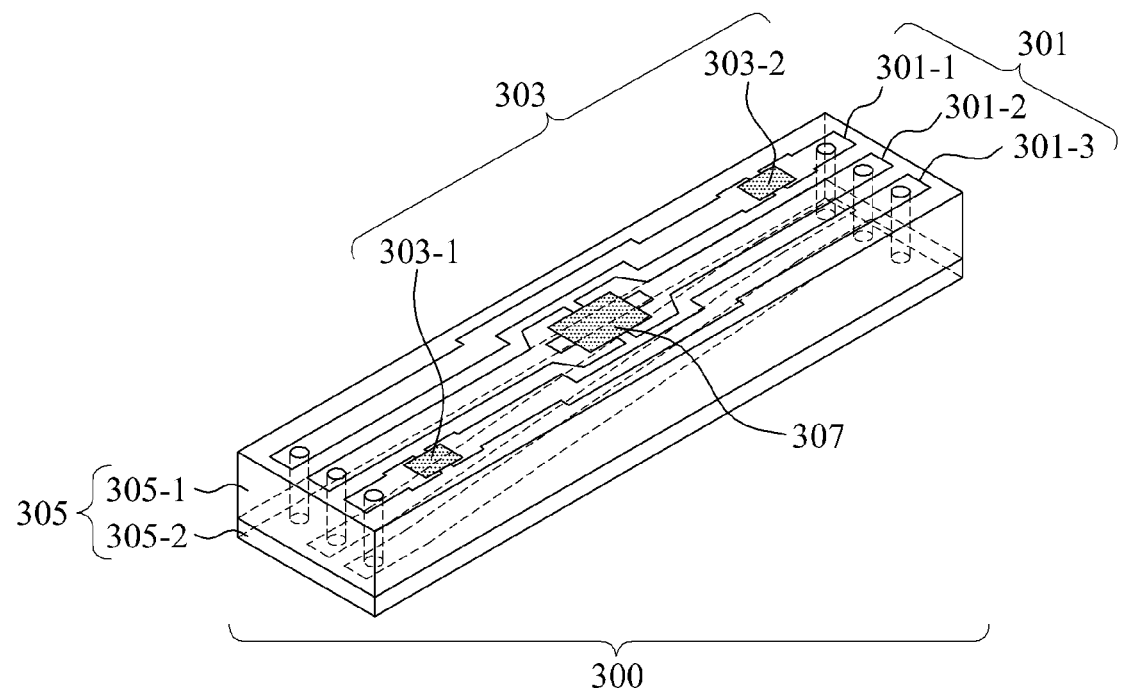
FIG. 3 is a perspective view illustrating a tag IC module apparatus according to still another embodiment of the present invention.

FIG. 3 is a perspective view illustrating a tag IC module apparatus 300 according to embodiments of the present invention.

Referring to FIG. 3, the tag IC module apparatus 300 may include a three-turn loop coil 301, two matching elements 303, and a multilayer PCB 305.

The three-turn loop coil 301 may be connected in series with a tag IC 307, and may be fabricated by connecting conductive patterns formed on at least one of a top surface and a bottom surface of two dielectric substrates, for example, an upper dielectric substrate 305-1 and a lower dielectric substrate 305-2 included in the multilayer PCB 305 with via holes formed on two dielectric substrates, for example, the upper dielectric substrate 305-1 and the lower dielectric substrate 305-2.

The two matching elements 303 refer to an element for performing reactance matching between the tag IC 307 and the three-turn loop coil 301, and may be configured to be inserted into one side and the other side of the three-turn loop coil 301, respectively.

The multilayer PCB 305 may be disposed below the tag IC 307, and patterned with the three-turn loop coil 301. In this instance, the multilayer PCB 305 may include two dielectric substrates, for example, the upper dielectric substrate 305-1 and the lower dielectric substrate 305-2.

Figure 4A:
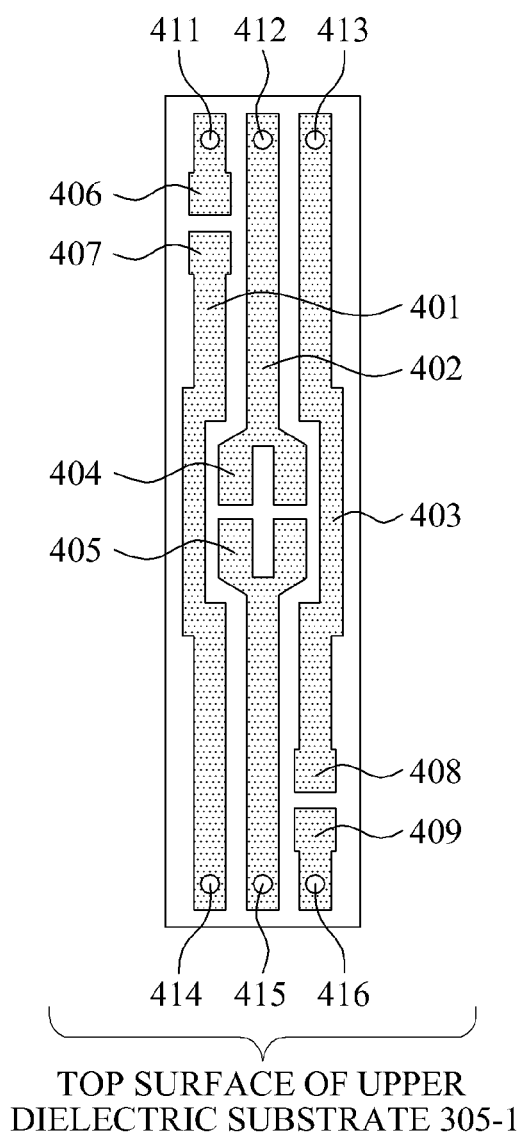
FIGS. 4A and 4B are views illustrating a top surface and a bottom surface of an upper dielectric substrate in a multilayer printed circuit board (PCB) of FIG. 3.
Figure 4B:
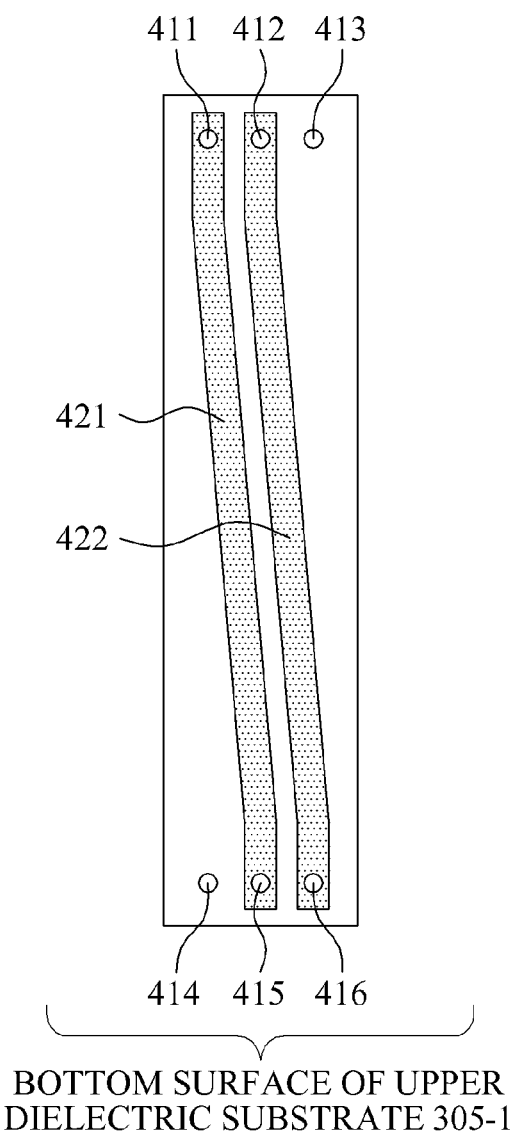

FIGS. 4A and 4B are views illustrating a top surface and a bottom surface of the upper dielectric substrate 305-1 in the multilayer PCB 305 of FIG. 3.

Referring to FIG. 4A, the upper dielectric substrate 305-1 may include, on the top surface, three-turn conductive loop lines, first mount electrodes 404 and 405 for mounting a tag IC, and second mount electrodes 406, 407, 408 and 409 for mounting two matching elements. Here, the three-turn conductive loop lines include a first loop line 401, a second loop line 402, and a third loop line 403.

Referring to FIG. 4B, the upper dielectric substrate 305-1 may include, on the bottom surface, two conductive loop lines 421 and 422. In this instance, the two conductive loop lines 421 and 422 included on the bottom surface of the upper dielectric substrate 305-1 may be connected with the first loop line 401, the second loop line 402, and the third loop line 403 included on the top surface of the upper dielectric substrate 305-1 through four via holes 411, 412, 415 and 416.

Figure 5A:
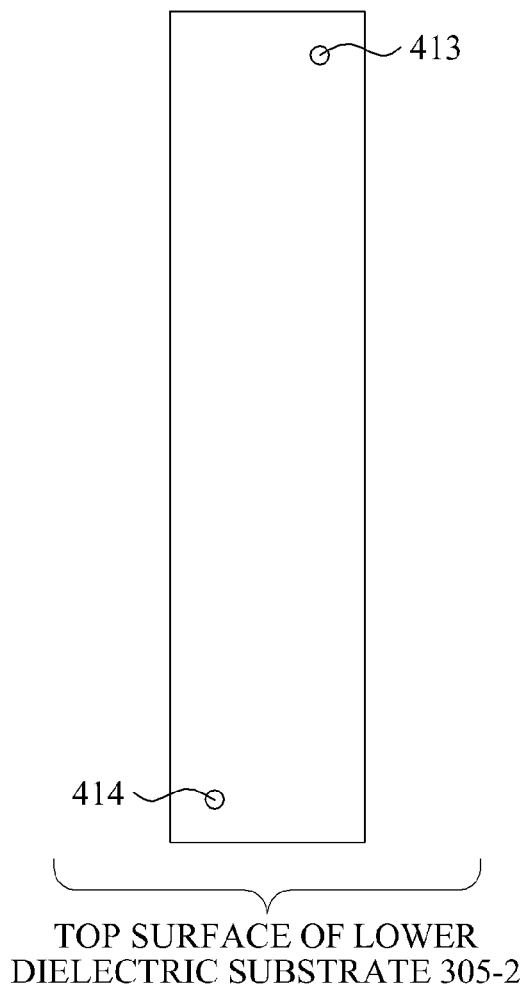
FIGS. 5A and 5B are views illustrating a top surface and a bottom surface of a lower dielectric substrate in the multilayer PCB of FIG. 3.
Figure 5B:
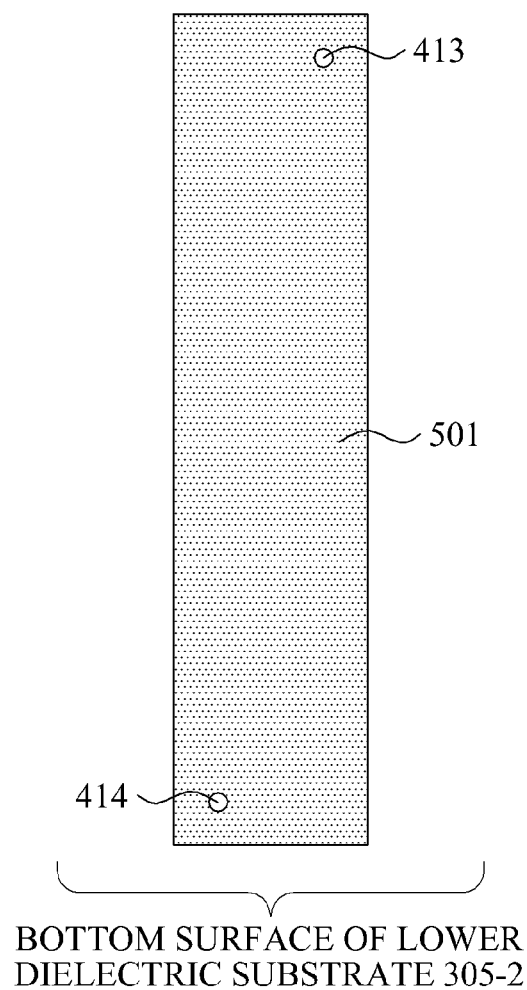

FIGS. 5A and 5B are views illustrating a top surface and a bottom surface of the lower dielectric substrate 305-2 in the multilayer PCB 305 of FIG. 3.

Referring to FIG. 5A, the lower dielectric substrate 305-2 does not include a conductive pattern, for example, a loop line on a top surface.

Referring to FIG. 5B, the lower dielectric substrate 305-2 may include, on the entire bottom surface, a conductive board 501 as a conductive pattern. However, this arrangement is only an example and thus, a conductive line may be included in lieu of the conductive board 501. In this instance, the conductive board 501 may be connected with conductive lines, for example, the first loop line 401 and the third loop line 403 included on the top surface of the upper dielectric substrate 305-1 disposed above the lower dielectric substrate 305-2 through two via holes 413 and 414.

FIG. 6 is a flowchart illustrating a method of fabricating a tag IC module apparatus according to an embodiment of the present invention.

Referring to FIG. 6, an n-turn loop coil may be patterned on a PCB in operation 601. Here, n denotes a natural number. In this instance, the PCB may include m dielectric substrates in which a conductive pattern is formed on at least one of a top surface and a bottom surface. Here, m denotes a natural number.

In particular, the n-turn loop coil is patterned on the PCB by connecting the conductive pattern formed on a dielectric substrate with a via hole formed on the dielectric substrate.

In operation 603, the PCB may be disposed below a tag IC, and the n-turn loop coil may be connected in series with the tag IC.

In operation 605, the tag IC module apparatus may be configured by connecting a matching element to perform reactance matching between the tag IC and the n-turn loop coil. In this instance, the matching element may be disposed between the tag IC and the n-turn loop coil, or may be disposed within the n-turn loop coil.

The matching element enables a reactance component of the tag IC and a reactance component of the n-turn loop coil, as viewed from a connector of the tag IC, to constitute a conjugate relationship.

In operation 607, the tag IC module apparatus may be attached to a metal body for the n-turn loop coil to inductively couple an induced RF signal to the metal body and transfer the induced RF signal to the tag IC.

According to embodiments of the present invention, there is provided a tag IC module apparatus which may be compactly fabricated by excluding a radiator and using an attachable metal body as the radiator.

According to embodiments of the present invention, there is provided a tag IC module apparatus which may reduce mounting costs by using an existing IC mounting device because a tag IC may be mounted to a compact PCB that has a predetermined shape regardless of a shape of a radiator.

According to embodiments of the present invention, there is provided a tag IC to module apparatus which may increase a tolerance against a static electricity because a tag IC may be insulated from a metal body in terms of a direct current (DC) when the tag IC is attached to the metal body using a nonconductive adhesive. For example, the metal body may be an object to which a tag is attached.

According to embodiments of the present invention, there is provided a tag IC module apparatus which may reduce design costs because impedance matching may be performed by changing a matching element value in a coil although an input-output impedance changes the tag IC to another tag IC.

According to embodiments of the present invention, there is provided a tag IC module apparatus which may have a decreased impedance change caused by a shape of an attached object or an external factor by installing a coil and a matching element within a compact multilayer substrate.

According to embodiments of the present invention, a function of a long-distance recognition tag may be realized by attaching, to an object, a separate radiator which is provided in a form of a thin metal board, and mounting a tag IC module apparatus on the attached radiator when an attached object is not provided in a form of a metal body.

According to embodiments of the present invention, there is provided a tag IC module apparatus which may be attached to a ground plane for a PCB to be used as a radiator.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A tag integrated circuit (IC) module apparatus, comprising:
    an n-turn loop coil connected in series with a tag IC, n denoting a natural number; and
    a first printed circuit board (PCB) disposed below the tag IC and patterned with the n-turn loop coil;
    wherein the tag IC is disposed over opposite ends of the coil on an upper surface of the PCB and connects the opposite ends across a gap separating the opposite ends;
    wherein the n-turn loop inductively couples an induced radio frequency (RF) signal to a metal body and transfers the induced RF signal to the tag IC when the tag IC module apparatus is attached to the metal body.

2. The apparatus of claim 1, wherein a loop surface of the n-turn loop coil is attached to the metal body in a vertical disposition.

3. The apparatus of claim 1, wherein the n-turn loop coil inductively couples an induced RF signal to a ground plane of a second PCB and transfers the induced RF signal to the tag IC when the tag IC module apparatus is attached to the second PCB of an electronic device.

4. The apparatus of claim 1, further comprising:
    a matching element to perform reactance matching between the tag IC and the n-turn loop coil,
    wherein the matching element enables a reactance component of the tag IC and a reactance component of the n-turn loop coil viewed from a connector of the tag IC to constitute a conjugate relationship.

5. The apparatus of claim 4, wherein the matching element is disposed between the tag IC and the n-turn loop coil, or disposed within the n-turn loop coil.

6. The apparatus of claim 1, wherein the first PCB comprises m dielectric substrates in which a conductive pattern is fabricated on at least one of a top surface and a bottom surface, and m denotes a natural number.

7. The apparatus of claim 6, wherein the n-turn loop coil is fabricated by connecting the conductive pattern with a via hole formed on the dielectric substrate.

8. The apparatus of claim 1, further comprising a first matching element for reactance matching between the tag IC and the loop coil on a lower surface of the PCB, and a second matching element for reactance matching between the tag IC and the loop coil on the upper surface of the PCB.

9. The apparatus of claim 8, wherein the first matching element is disposed over a second gap in the loop coil, and the second matching element is disposed over a third gap in the loop coil.

10. A method of fabricating a tag integrated circuit (IC) module apparatus, the method comprising:
    patterning an n-turn loop coil on a printed circuit board (PCB), n denoting a natural number;
    disposing the PCB below a tag IC, and connecting the tag IC between opposite mounting electrodes on an upper surface of the PCB across a gap separating the opposite mounting electrodes to connect the tag IC with the n-turn loop coil in series; and
    attaching the tag IC module apparatus to a metal body for the n-turn loop coil to inductively couple an induced radio frequency (RF) signal to the metal body and transfer the induced RF signal to the tag IC.

11. The method of claim 10, further comprising:
    connecting a matching element to perform reactance matching between the tag IC and the n-turn loop coil,
    wherein the matching element enables a reactance component of the tag IC and a reactance component of the n-turn loop coil viewed from a connector of the tag IC to constitute a conjugate relationship.

* * * * *